May 10, 1955
C. R. YOUNG
2,708,041
JIFFY SKID LOADER FOR TRUCKS
Filed May 4, 1954
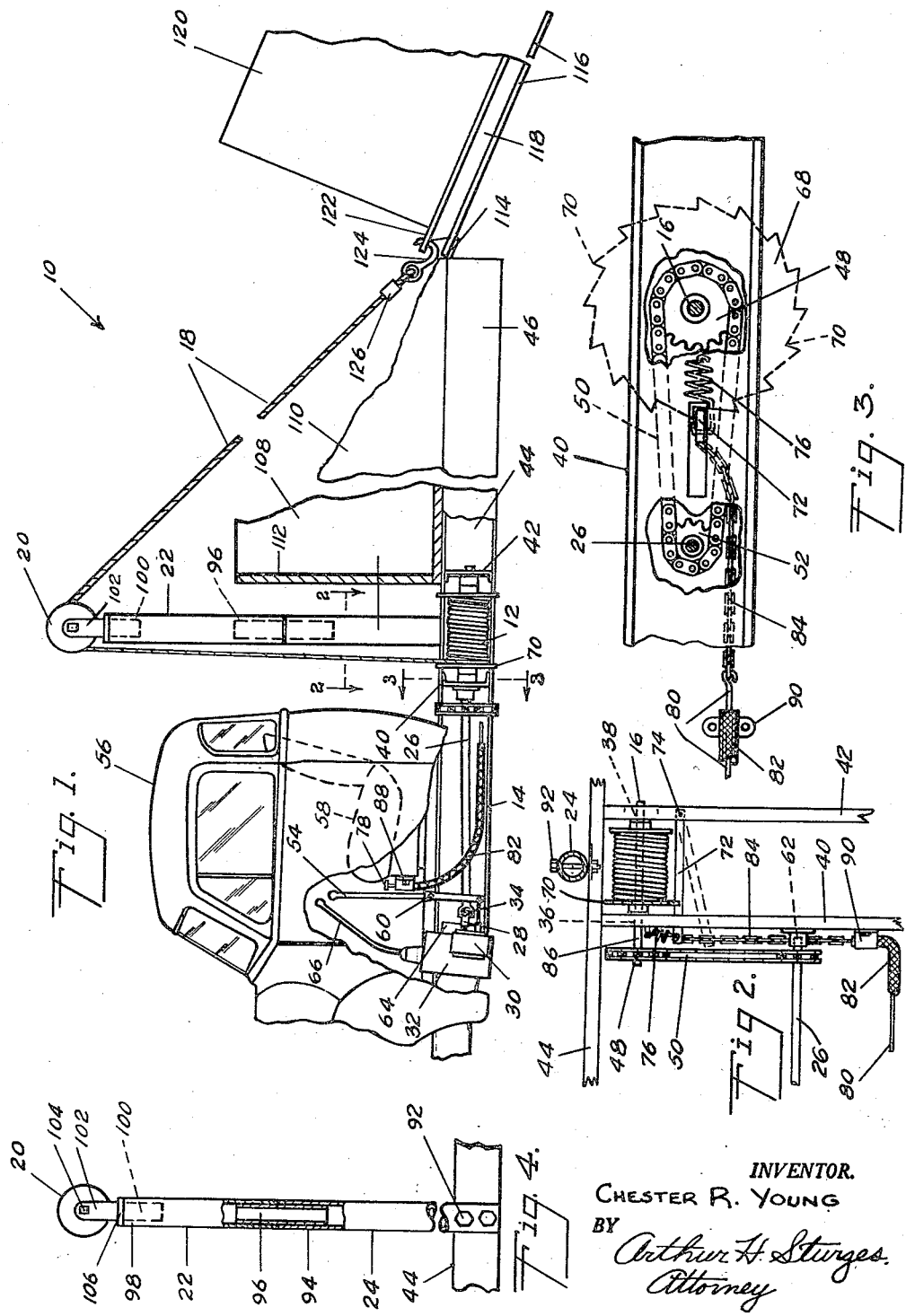
INVENTOR.
CHESTER R. YOUNG
BY
Arthur H. Sturges
Attorney United States Patent Office 2,708,041
Patented May 10, 1955

2,708,041

JIFFY SKID LOADER FOR TRUCKS

Chester Ray Young, Cheyenne, Okla.

Application May 4, 1954, Serial No. 427,489

1 Claim. (Cl. 214—85.1)

This invention relates to a hoisting attachment, such as a windlass, adapted to be mounted on the body of a truck and actuated by a power take off shaft thereof, and in particular a cable winding drum rotatably mounted in a platform of a truck body and operatively connected to a power take off shaft of the truck whereby a cable extended from the drum over a pulley on a post extended upwardly from the platform is adapted to draw comparatively heavy merchandise, such as bales of cotton, bales of broom corn, crated merchandise, and the like into the body of the truck to facilitate the loading, unloading, and transportation of cargo and the like with motor vehicles.

The purpose of this invention is to provide a hoisting assembly adapted to be installed on trucks whereby comparatively heavy merchandise may be loaded upon and unloaded from motor vehicle truck bodies.

Various types of elevators, hoists, and other devices have been used for loading and unloading heavy cargo and the like, however, particularly where platforms are raised and lowered the cost of installation is comparatively high, and such devices interfere with the use of the trucks on which they are installed for other purposes.

With this thought in mind this invention contemplates an assembly including a drum or spool, a cable, and suitable operating instrumentalities whereby the drum may be actuated by a power take-off shaft of a truck on which the assembly is installed so that an operator may draw heavy objects into the body of the truck while positioned in the operator's seat in the cab of the truck.

The object of this invention is, therefore, to provide a hoisting assembly that is adapted to be incorporated in the platform of a conventional truck.

Another object of the invention is to provide means whereby hoisting apparatus installed in a motor truck may be operated by the drive or power take-off shaft of the truck.

Another important object of the invention is to provide hoisting equipment to facilitate handling heavy objects in transportation by motor trucks whereby the cost of transportation and handling of heavy merchandise is reduced to a minimum.

A further object of the invention is to provide hoisting apparatus for motor trucks that is adapted to be installed in a platform of a truck by an average mechanic and with very little change in the construction of the platform.

A still further object of the invention is to provide a power actuated hoist adapted to be installed in motor trucks in which the hoist is of simple and economical construction.

With these and other objects and advantages in view the invention embodies a power take-off shaft extended from a transmission housing of a motor truck, a drum rotatably mounted in a platform of the truck, means for operatively connecting the drum to the power take-off shaft, a post having a pulley in the upper end mounted on the platform, a cable having a hook on the extended end positioned on the drum and trained over the pulley, a plate upon which cargo is drawn upwardly into the body of the truck, and latching means for retaining the parts in operative positions.

Other features and advantages of the invention will appear from the following description taken in connection with the drawings, wherein:

Figure 1 is a side elevational view showing portions of a truck platform, body, and cab illustrating the positions of hoisting equipment thereon, and showing the cable drawing a crate or the like onto the platform.

Figure 2 is a detail taken on line 2—2 of Figure 1 showing the mounting of the drum in the platform of the truck.

Figure 3 is a detail taken on line 3—3 of Figure 1 showing the latching and drum driving elements.

Figure 4 is a detail showing a pulley supporting post, parts of the post being broken away to illustrate the pin for connecting the upper and lower parts of the post.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any way departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a drum or reel rotatably mounted in the chassis or platform 14 by a shaft 16, numeral 18 a cable extended from the drum over a pulley 20 on a post having an upper section 22 and a lower section 24, and numeral 26 a drive shaft actuated by a power take-off shaft 28 extended from a power take-off housing 30 on the transmission housing 32, and the drive shaft 26 is connected to the power take-off shaft 28 through a clutch 34.

The shaft 16 is rotatably mounted by bearings 36 and 38 in transversely positioned beams 40 and 42 of the platform, and the beams are supported between side rails 44 and 46. One end of the shaft 16 is provided with a sprocket 48 which is driven by a chain 50 that is trained over the sprocket 48 and also over a sprocket 52 on the drive shaft 26. A clutch lever 54 positioned in the cab 56 of the truck and positioned within easy reach of an operator on a seat 58, is pivotally mounted by a pin 60 whereby the lower end is adapted to actuate the clutch 34 when it is desired to operate or release the drum 12. One end of the drive shaft 26 is rotatably mounted in a bearing 62 on the beam 40, and the opposite end is rotatably mounted in a bearing 64 on the transmission housing 32.

The transmission housing is provided with a conventional gear shift lever 66 by which the drum may be operated in either direction, such as for winding and unwinding the cable.

A flange 68 on one end of the drum 12 is provided with ratchet teeth 70 that are positioned to engage a latch bar 72 which is pivotally mounted by a pin 74 on the beam 42, and, as shown in Figures 2 and 3, the latch bar 72 is urged into engagement with the teeth 70 by a spring 76, one end of which is connected to the latch bar and the other to the beam 40. The latch bar is adapted to be withdrawn from the ratchet wheel by a knob 78 also positioned within easy reach of an operator on the seat in the cab of the truck, and the knob is positioned on the end of a relatively stiff wire 80 which extends through a sheath 82 and which is connected to one end of a chain 84, the opposite end of which is connected to the latch bar at the point 86. The sheath 82 is retained in position with brackets 88 and 90, the bracket 88 being secured to the forward edge of the seat 58, and the bracket 90 being secured to the beam 40.

The lower section 24 of the post on which the pulley 20 is positioned is secured to the side rail 44 with bolts 92, and the upper end of the lower section is provided with a bearing 94 in which the lower end of a pin 96, secured, such as by welding in the lower end of the upper section 22, is pivotally mounted. The upper section 22 of the post is also provided with a bearing, as indicated by the numeral 98, and a pin 100 extended downwardly from a yoke 102 in the arms of which the pulley 20 is rotatably mounted by a pin 104, is pivotally mounted in the bearing whereby the pulley is free to turn laterally. The yoke is provided with a collar 106 which rests upon the upper end of the post and prevents downward movement of the yoke into the post.

In the design shown in Figure 1 the platform is provided with a body having side walls 108 and 110 and an end wall 112, and the rear end of the platform is reinforced with a plate 114 which provides a support for an inclined plate 116 upon which skids or trays 118 with objects, such as a crate 120, may be drawn upwardly into the body. The skid 118 is provided with an eye 122 in which a hook 124, on the end of the cable 18, is positioned. The hook may be attached to the cable with a swivel joint 126, and it will be understood that the hook may be attached to bales of cotton, or broom straws by other suitable means.

With the parts installed on a truck as disclosed and described bales of cotton, broom corn, and the like, and merchandise or other cargo may be drawn upwardly into the truck body by the engine of the truck through the transmission and power take-off, and the drum from which the cable extends may be started and released as desired. By this means objects may be lowered slowly by gravity with the cable and drum controlling the downward movement thereof.

From the foregoing specification it will become apparent that the invention disclosed will adequately accomplish the functions for which it has been designed and in an economical manner, and that its simplicity, accuracy, and ease of operation are such as to provide a relatively inexpensive device considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

In a skid loader for use on a truck having a platform, a body, a cab spaced from the body and positioned on the platform, and a transmisison also mounted in the platform and having a power take-off unit thereon, the combination which comprises a shaft adapted to be rotatably mounted in the platform, a post having a lower section mounted on the platform and positioned between the cab and body and an upper section removably mounted on the lower section, a pulley rotatably mounted on the upper end of the upper section of the post, a drum mounted on the shaft adapted to be rotatably mounted in the platform, a cable wrapped around the drum, extended over the pulley at the upper end of the post and having a hook on the extended end, a longitudinally disposed power take-off shaft extended from the power take-off unit of the transmission of the truck, sprockets on the power take-off shaft and shaft on which the drum is mounted, a chain trained over said sprockets for rotating the drum by said power take-off of the truck, said drum having flanges at the ends and the flange at one end of the drum having ratchet teeth in the peripheral edge, a latch bar pivotally mounted in the platform and positioned to engage the ratchet teeth of the flange of the drum for preventing rotation of the drum in the direction of unwinding the cable, a spring for retaining the latch bar in engagement with the teeth of the flange of the drum, a knob positioned in the cab and connected by a flexible member to the latch bar for actuating the latch bar to release the drum, a clutch positioned in the connection of the power take-off shaft to the power take-off unit of the transmission, and a clutch lever positioned in the cab and operatively connected to the clutch for rotating the drum.

References Cited in the file of this patent

UNITED STATES PATENTS

| | | |
|---|---|---|
| 1,481,681 | Bryan | Jan. 22, 1924 |
| 1,677,733 | Schiftner | July 17, 1928 |
| 2,188,374 | Sanchez | Jan. 30, 1940 |

FOREIGN PATENTS

| | | |
|---|---|---|
| 101,177 | Australia | May 27, 1937 |